United States Patent
Murthy

(10) Patent No.: US 11,553,576 B2
(45) Date of Patent: Jan. 10, 2023

(54) SYSTEMS AND METHODS FOR AUTOMATICALLY CONTROLLING ILLUMINATION OF A WORKPLACE

(71) Applicant: SIGNIFY HOLDING B.V., Eindhoven (NL)

(72) Inventor: Abhishek Murthy, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/424,674

(22) PCT Filed: Jan. 21, 2020

(86) PCT No.: PCT/EP2020/051398
§ 371 (c)(1),
(2) Date: Jul. 21, 2021

(87) PCT Pub. No.: WO2020/152156
PCT Pub. Date: Jul. 30, 2020

(65) Prior Publication Data
US 2022/0110202 A1 Apr. 7, 2022

Related U.S. Application Data

(60) Provisional application No. 62/796,333, filed on Jan. 24, 2019.

(30) Foreign Application Priority Data

Feb. 7, 2019 (EP) ..................................... 19155943

(51) Int. Cl.
H05B 47/16 (2020.01)
H05B 47/19 (2020.01)

(52) U.S. Cl.
CPC ............. *H05B 47/16* (2020.01); *H05B 47/19* (2020.01)

(58) Field of Classification Search
CPC ........ H05B 47/10; H05B 47/16; H05B 47/19
See application file for complete search history.

(56) References Cited

U.S. PATENT DOCUMENTS

| 9,485,837 B2 | 11/2016 | Van De Sluis et al. |
| 2017/0245354 A1 | 8/2017 | Yadav et al. |
| 2017/0324933 A1 | 11/2017 | Alrod et al. |
| 2018/0255628 A1* | 9/2018 | Yadav .................... H05B 45/20 |
| 2019/0230775 A1* | 7/2019 | Krajnc ................. H05B 47/115 |

* cited by examiner

*Primary Examiner* — Jimmy T Vu

(57) ABSTRACT

The present disclosure is directed to inventive systems and methods for automatically controlling illumination of a workplace. The lighting system includes one or more tunable luminaires and a calendar module executing on a computer-implemented device configured to receive a calendar entry. The calendar entry includes a starting time of a future event, the identity of one or more invitees to the future event, and a lighting scene selection for the workplace. A lighting controller receives the lighting scene selection from the calendar module and generates one or more control signals to automatically adjust at least one characteristic of light emitted by the tunable luminaires in the workplace for the future event based on the lighting scene selection in the calendar entry.

14 Claims, 5 Drawing Sheets

SYSTEMS AND METHODS FOR AUTOMATICALLY CONTROLLING ILLUMINATION OF A WORKPLACE

CROSS-REFERENCE TO PRIOR APPLICATIONS

This application is the U.S. National Phase application under 35 U.S.C. § 371 of International Application No. PCT/EP2020/051398, filed on Jan. 21, 2020, which claims the benefit of U.S. Provisional Patent Application No. 62/796,333, filed on Jan. 24, 2019 and European Patent Application No. 19155943.4, filed on Feb. 7, 2019. These applications are hereby incorporated by reference herein.

FIELD OF THE INVENTION

The present disclosure is directed to systems and methods for automatically controlling illumination of a workplace.

BACKGROUND

Current lighting systems offer a variety of preset lighting scenes that modulate light color, intensity, and distribution in a space, such as workplace. For example, lighting scenes can be provided in a workspace to meet the needs of specific activities of a meeting or visual task and/or set the mood for the meeting. Additionally, lighting scenes can be provided for audiovisual meeting presentations, such as PowerPoint presentations or Skype presentations. Also, lighting scenes can be provided to affect mood and concentration without causing melatonin suppression or delayed sleep onset. However, there is a continued need in the art for systems and methods to control illumination of a workplace.

SUMMARY OF THE INVENTION

The present disclosure is directed to systems and methods for automatically controlling illumination of a workplace. In particular, embodiments of the present disclosure are directed to lighting systems which include one or more tunable luminaires and a calendar module executing on a computer-implemented device configured to receive a calendar entry from a user. The calendar entry includes a lighting scene selection for the workplace. A lighting controller receives the lighting scene selection from the calendar module and generates one or more control signals to automatically adjust at least one characteristic of the tunable luminaires in the workplace for the future event based on the lighting scene selection.

Generally, in one aspect, a lighting system for controlling illumination of a workplace is provided. The lighting system includes: (i) one or more tunable luminaires arranged to illuminate the workplace; (ii) a calendar module executing on a computer-implemented device configured to receive a calendar entry. The calendar entry comprises a starting time of a future event, the identity of one or more invitees to the future event, and a lighting scene selection for the workplace. The lighting system also includes a lighting controller in connection with the calendar module and the one or more tunable luminaires. The lighting controller is configured to: (i) receive the lighting scene selection from the calendar module; and (ii) generate one or more control signals to automatically adjust at least one characteristic of light emitted by the one or more tunable luminaires in the workplace for the future event based on the lighting scene selection in the calendar entry.

According to an embodiment, the system is further configured such that the at least one characteristic of the tunable luminaires that is adjusted is selected from: color temperature, light intensity, brightness, lighting power density, lighting power, illuminance, equivalence melanopic lux, light angle, and correlated color temperature.

According to an embodiment, the system is further configured to provide a lighting scene recommendation to the user via a user interface of the calendar module.

Generally, in another aspect, a method of controlling illumination of a workplace is provided. The method includes receiving, by a calendar module executing on a computer-implemented device, a calendar entry. The calendar entry comprises: (i) a starting time of a future event; and (ii) a lighting scene selection for the workplace. The method also includes automatically adjusting, by a lighting network in communication with the computer-implemented device, at least one characteristic of light emitted by a plurality of tunable luminaires in the workplace for the future event based on the lighting scene selection in the calendar entry.

According to an embodiment, the method further allows for the at least one characteristic of the tunable luminaires that is adjusted to be selected from: color temperature, light intensity, brightness, lighting power density, lighting power, illuminance, equivalence melanopic lux, light angle, and correlated color temperature.

According to an embodiment, the method further allows for the lighting scene to be selected using a user interface in the calendar module by a drop down option, a voting option, or a checkbox option.

According to an embodiment, the method further includes the step of providing a lighting scene recommendation to the user via the user interface of the calendar module.

According to an embodiment, the method allows for the lighting scene recommendation to be provided based on historical data of lighting scene selections. According to an embodiment, the method allows for the computer-implemented device to be a desktop computer, handheld computer, or smartphone.

Generally, in another aspect, a method of controlling illumination of a workplace is provided. The method includes receiving, by a calendar module executing on a computer-implemented device, a calendar entry. The calendar entry includes: (i) a starting time of a future event; (ii) the identity of one or more invitees to the future event; and (iii) a user lighting scene selection for the workplace. The method of controlling illumination of a workplace also includes receiving, by the calendar module executing on the computer-implemented device, from the one or more invitees, one or more invitee lighting scene selections for the workplace. The method further involves determining a workplace lighting setting at least in part based on the user lighting scene selection and the one or more invitee lighting scene selections. The method further involves automatically adjusting, by a lighting network connected to the computer-implemented device, at least one characteristic of light emitted by a plurality of tunable luminaires in the workplace for the future event based on the determined workplace lighting setting.

According to an embodiment, the method further allows for the at least one characteristic of the tunable luminaires that is adjusted to be selected from: color temperature, light intensity, brightness, lighting power density, lighting power, illuminance, equivalence melanopic lux, light angle, and correlated color temperature.

According to an embodiment, the method further allows for the lighting scene to be selected using a user interface in the calendar module by a drop down option, a voting option, or a checkbox option.

According to an embodiment, the method further includes the step of providing a lighting scene recommendation to the user via the user interface of the calendar module.

According to an embodiment, the method allows for the lighting scene recommendation to be provided based on historical data of lighting scene selections.

According to an embodiment, the method allows for the computer-implemented device to be a desktop computer, handheld computer, or smartphone.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems and methods for automatically controlling illumination of a workplace. More generally, Applicant has recognized and appreciated that it would be beneficial to provide a calendar module for the preselection of a lighting setting for a future event. The user of the calendar module and invitees of a future event can provide input about the lighting setting, and a lighting scene recommendation may be made automatically based on data input into the calendar module. An advantage of such systems of the present disclosure is that they do not require additional sensors to be installed in the workplace.

In view of the foregoing, various embodiments and implementations are directed to systems and methods for controlling illumination of a workplace comprising a calendar module executing on a computer-implemented device configured to receive a calendar entry and a lighting controller in connection with the calendar module and one or more tunable luminaires, wherein the lighting controller is configured to adjust at least one characteristic of the light emitted by the one or more tunable luminaires for the future event based on a lighting scene selection in the calendar entry.

Figure 1:
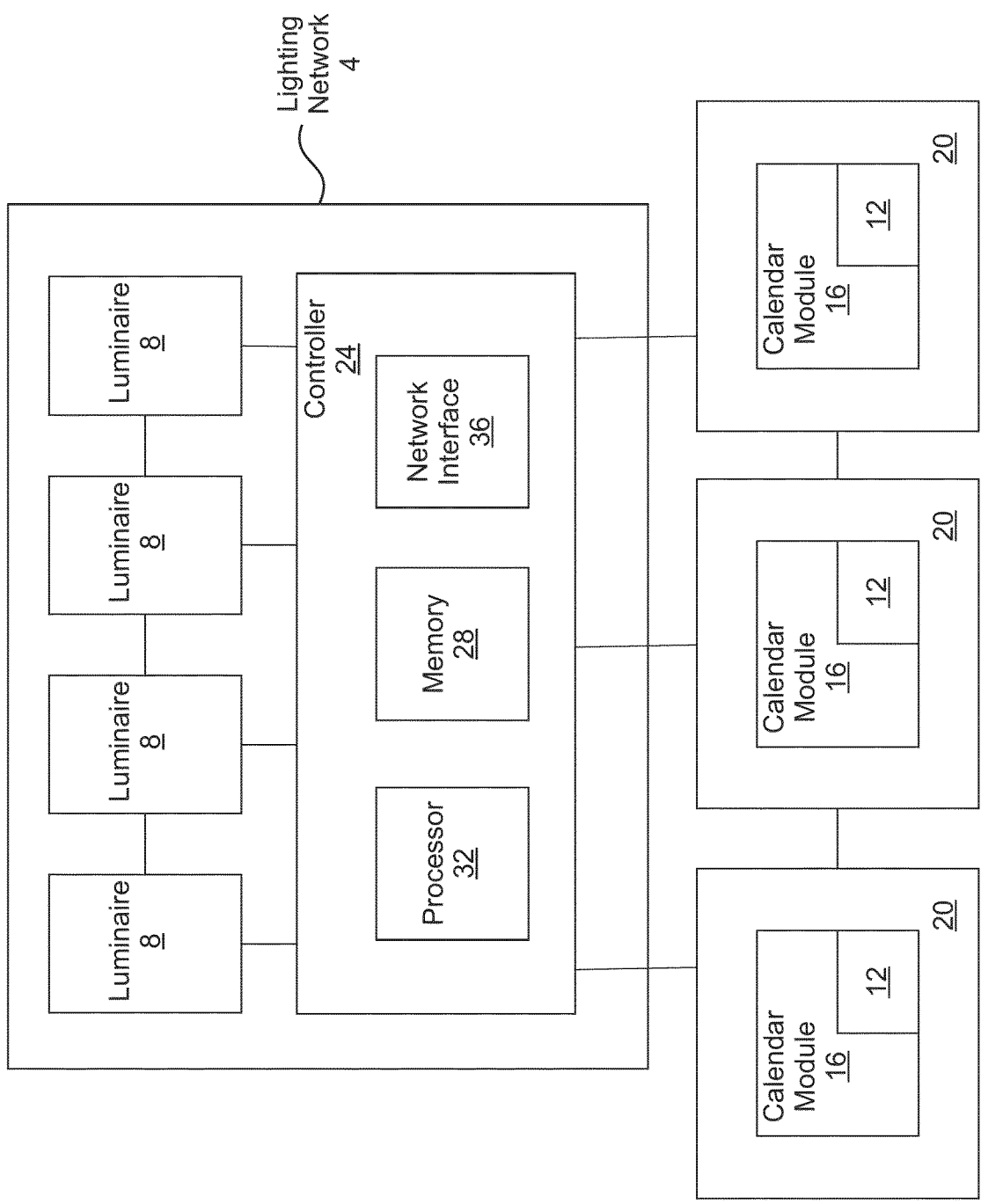
FIG. 1 is a schematic illustration of a lighting system and a calendar module.

FIG. 1 is a schematic diagram of an exemplary system for controlling illumination of a workplace. The lighting network 4 includes four luminaires 8. Although FIG. 1 illustrates an arrangement with four luminaires, any number of luminaires may be arranged. The lighting network 4 has a controller 24 which is interconnected with the tunable luminaires 8 in a manner to facilitate the transport of information with one or more of the luminaires.

The luminaires 8 are tunable and lighting characteristics of the luminaires 8 can be adjusted. The communications between controller 24 and luminaires 8 can include commands sent from the controller 24 to luminaires 8. These commands can cause the luminaire 8 to, for example, turn on, or turn off, or to decrease or increase in intensity, or to change spectral power distribution of its illumination. The commands can also tune or adjust luminaire color, color temperature, light intensity, brightness, lighting power density, lighting power, illuminance, equivalence melanopic lux, light angle, or correlated color temperature. By tuning or adjusting the characteristics of the luminaires 8, various lighting effects can be created and a lighting scene can be set.

The term "luminaire" as used herein refers to an apparatus including one or more light sources of same or different types. A given luminaire may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" as used herein refers to a lighting unit that includes one or more LED-based light sources as discussed above, alone or in combination with other non LED-based light sources.

The term "light source" as used herein refers to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers. A given light source may be configured to generate electromagnetic radiation within the visible spectrum, outside the visible spectrum, or a combination of both. Additionally, a light source may include as an integral component one or more filters (e.g., color filters), lenses, or other optical components. Also, it should be understood that light sources may be configured for a variety of applications, including, but not limited to, indication, display, and/or illumination.

The term "network" as used herein refers to any interconnection of two or more devices (including controllers or processors) that facilitates the transport of information (e.g. for device control, data storage, data exchange, etc.)

between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

As illustrated in FIG. 1, the controller 24 features a processor 32, a network interface 36, and memory 28. The term "controller" is used herein generally to describe various apparatus relating to the operation of one or more luminaires. A controller can be implemented in numerous ways (e.g., such as with dedicated hardware) to perform various functions discussed herein. A controller that employs one or more processors may be programmed using software to perform various functions discussed herein. A controller may be implemented as a combination of dedicated hardware to perform some functions and a processor (e.g., one or more programmed microprocessors and associated circuitry) to perform other functions.

Figure 2:
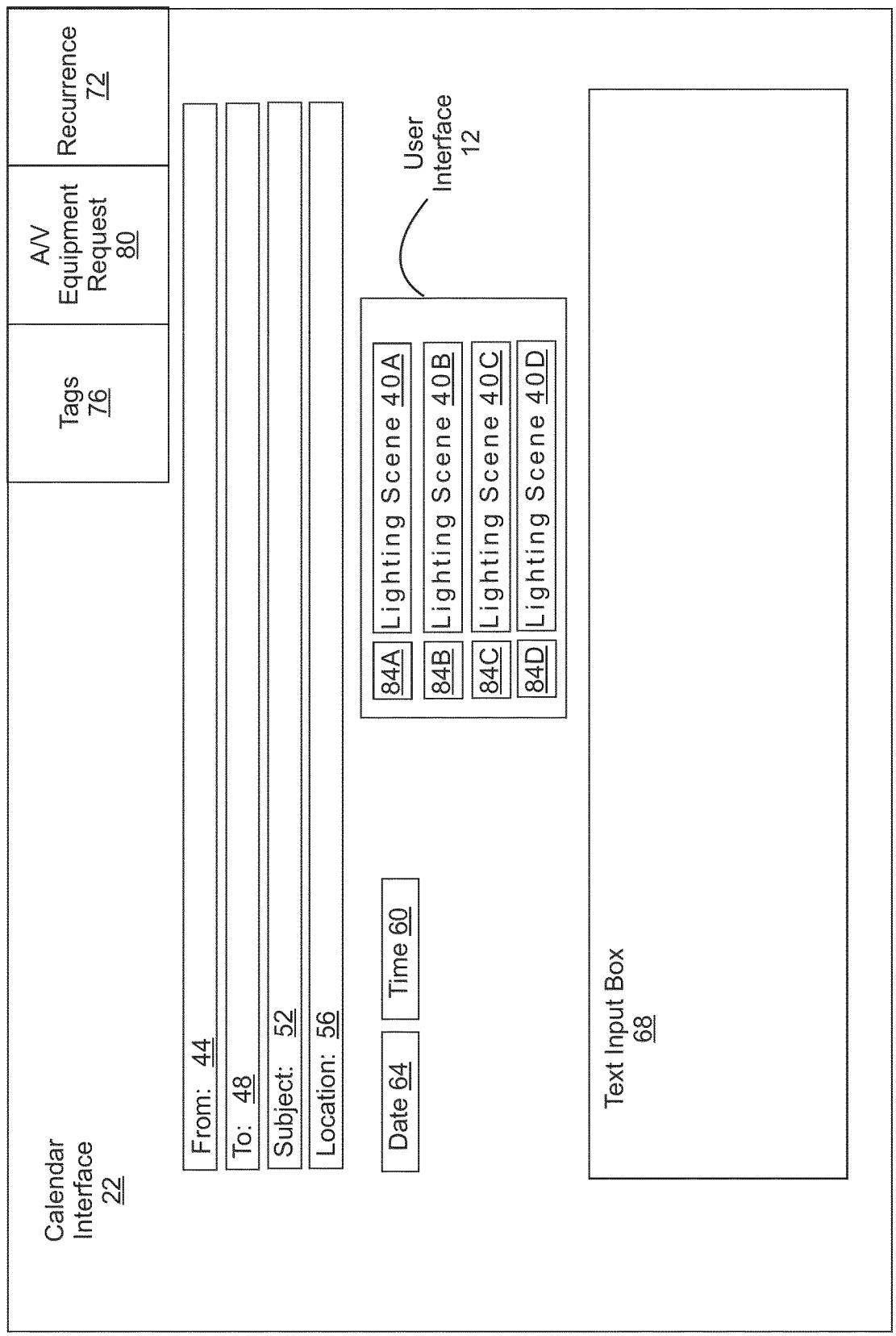
FIG. 2 is schematic illustration of an exemplary calendar interface of a calendar module.
Figure 3:
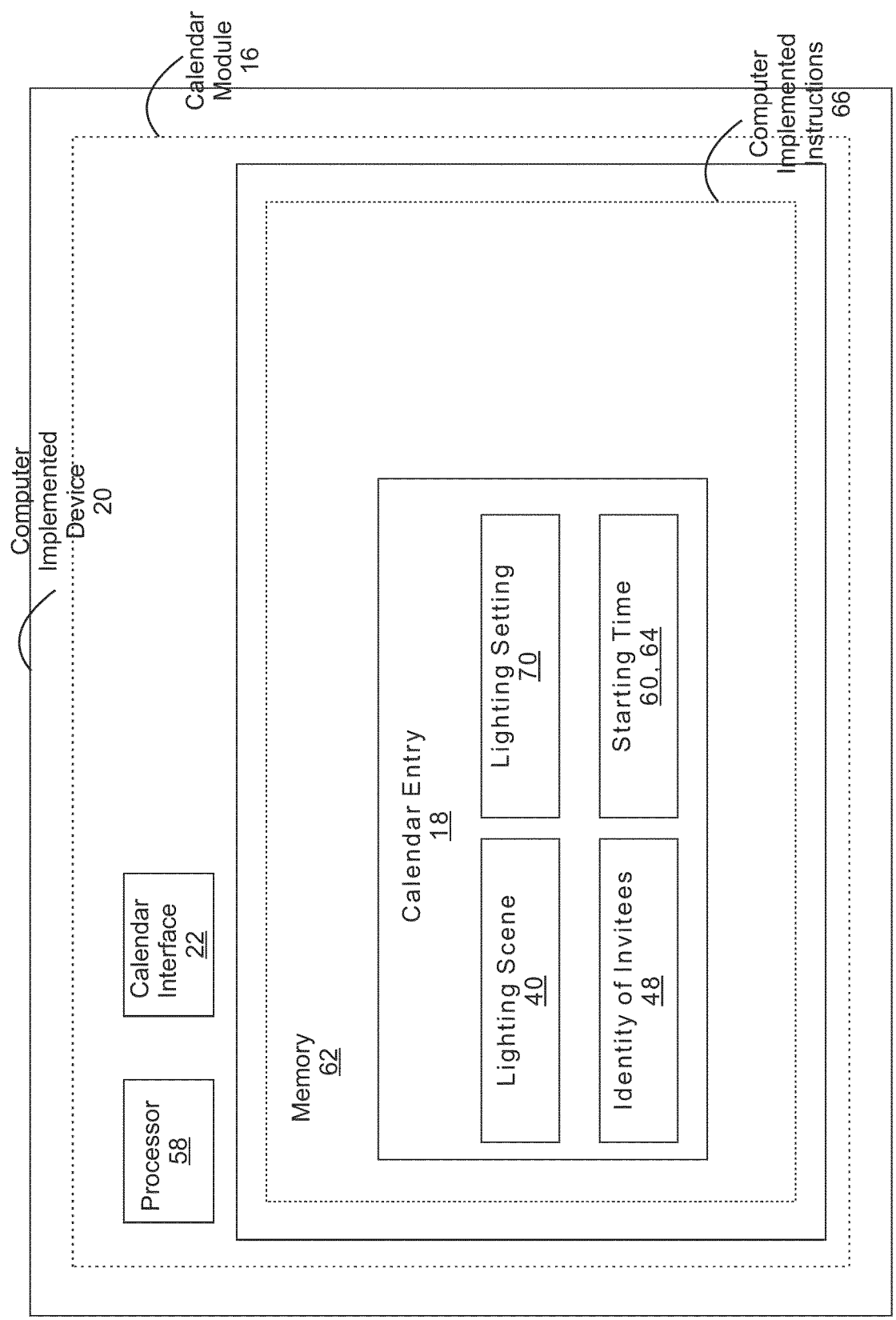
FIG. 3 is a schematic illustration of an exemplary calendar module executing on a computer-implemented device.

The memory 28 and the processor 32 may take any suitable form known in their respective arts that is useful for controlling, monitoring, and/or otherwise assisting in the operation of the luminaires 8, including adjusting lighting characteristics of the luminaires to create lighting effects. Embodiments of processor 32 include, but are not limited to, conventional microprocessors, application specific integrated circuits (ASICs), and field programmable gate arrays (FPGAs). The network interface 36 may be a wireless transceiver or any other device that enables the luminaires 8 to communicate wirelessly with each other as well as other devices utilizing the same wireless protocol standard and/or to otherwise monitor network activity. The network interface 36 may also use wire/cable and/or fiber optic links. It is to be understood that the controller 24 is shown schematically in FIG. 1 and may include any other components useful for controlling, monitoring, and/or otherwise assisting in the operation of the luminaires 8, including adjusting characteristics of the luminaires to create lighting effects based on a lighting scene 40 (as shown in FIG. 2 and FIG. 3) selection.

The controller 24 may be associated with one or more storage media or memory 28, e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The term "program" as used herein refers in a generic sense to any type of computer code (e.g., software or microcode) that can be employed to program one or more processors or controllers.

Referring to FIG. 1, the calendar modules 16 and controller 24 are connected in a manner to facilitate the transport of information. The calendar modules 16 are executed on computer-implemented devices 20. Exemplary computer-implemented devices 20 include desktop computers, handheld computers, or smartphones. The calendar modules 16 are configured to receive a calendar entry. The calendar modules 16 include a user interface 12, by which a user makes a lighting scene selection. The calendar modules 16 are also configured to provide a lighting scene recommendation to the user via the user interface 12 of the calendar module. The lighting controller 24 is configured to receive a lighting scene selection from the calendar module 16. The lighting controller 24 is also configured to generate one or more control signals to automatically adjust at least one characteristic of the tunable luminaires.

Exemplary calendar modules 16 may include electronic calendar products, such as Microsoft Outlook and Lotus Organizer; web-based products, such as Google Calendar; collaboration management tools like Slack; scheduling functions on computer-based or internet-based communication tools, such as Skype, Webex, or Zoom; and/or any other electronic calendar or scheduling products and/or programs. The calendar module 16 allows one to manage personal events such as appointments and shared events, referred to generally as meetings. A calendar module 16 manages calendar entries 18 (as shown for example in FIG. 3) in an electronic calendar and may provide scheduling and alarm functions in addition to full integration with contact management, time entry, billing and project management applications.

FIG. 2 shows an exemplary calendar interface 22 of a calendar module 16 (as shown in FIG. 3) for creating a calendar entry 18 (as shown in FIG. 3). The calendar interface 22 allows for the selection of a date 64 at a time 60 for a future event. The event can also be scheduled to occur again at another date and time, by inputting a selected recurrence 72 into a recurrence field in the calendar interface 22. For example, a particular meeting may take place every Tuesday at 12 pm. The calendar interface identifies the individual who created the event, the user 44. The identity of people who are invited to attend or participate in the event, invitees, is indicated in the calendar interface in box 48. The event is associated with a particular subject 52 and location 56 which can be input in the calendar interface 22. The calendar interface 22 allows for additional text, hyperlinks, or attachments to be entered and associated with the future event, in a text input box 68. The event can further be categorized using user 44 inputted tags 76, for example, priority tags for low or high priority events, or other category tags which are preset or created by the user 44 which further characterize and identify the event for the user and event invitees. When the event is scheduled, the user 44 can also select audio or visual equipment to be setup for the event, for example, a video conference setup, a projector for a PowerPoint presentation, etc., using an A/V equipment interface 80.

A calendar module 16 can be used to schedule an event; revise the date 64, time 60, subject 52, recurrence 72, event invitees 48, subject 52, location 56, inputted text, hyperlinks documents 68, equipment for an event 80, or other information, description, or requirements associated with the event; invite invitees to the event; respond to an invitation to indicate attendance or participation in an event or to modify any information, description, or requirements associated with the event, including those illustrated in FIG. 2; or otherwise facilitate the creation, modification, or termination of a calendar entry 18 (as shown in FIG. 3). Any of a variety of calendar interfaces can be used to perform these tasks and create a calendar entry 18 (as shown in FIG. 3).

Referring to FIG. 2, a user interface 12 allows the user to select a lighting scene 40 for the event. The user interface 12 may have, for example, a drop down option, a voting option, or a checkbox option 84, or any other conventionally known methods of selection, for the selection of a lighting scene 40. A lighting scene 40 is a preset that modulates the distribution of light as well as light intensity and color temperature and other characteristics of luminaires 8 (as shown in FIG. 1). For example, color, color temperature, light intensity, brightness, lighting power density, lighting power, illuminance, equivalence melanopic lux, light angle, or correlated color temperature characteristics of the luminaires can be adjusted according to various recipes to create certain visual effects. Various lighting scenes 40 may be available for selection, for example, related to specific activities, specific visual tasks, time of day, and/or intended mood of the event. These preset lighting scenes 40 may be designed to meet the needs of specific activities and visual tasks, such as an A/V lighting scene 40 for PowerPoint or Skype presentations. As another example, lighting scene 40 presets may relate to the intended mood for the event, for example, face to face meetings requiring concentration or high energy. As another example, the lighting scene 40 may be intended to stimulate alertness, providing an energy boost for an event by the lighting setup in the meeting space. A blue-biased energy boost lighting scene 40 may be appropriate for morning and post lunchtime events. A red-biased energy boost lighting scene 40 may be appropriate for late afternoon and evening events, to provide a similar energizing effect without causing melatonin suppression and delayed sleep onset.

FIG. 3 is a schematic illustration of an exemplary calendar module 16 executing on a computer-implemented device 20. A calendar module 16 is executed on a computer implemented device 20. The calendar module 16 has a calendar interface 22 into which a user inputs information related to an event. The calendar module 16 has memory 62 for storing a set of non-transitory computer implemented instructions 66. The calendar module 16 also has a processor 58 for executing a set of non-transitory computer implemented instructions 66. The memory 62 stores a calendar entry 18; a starting time 60, 64 associated with the calendar entry 18; the identity of invitees 48 associated with the calendar entry 18; lighting scene selections associated with the calendar entry 18; and the lighting setting associated with the calendar entry 18. The memory 62 may also store any other information input by a user 44 or invitee 48 into the calendar module 16, including the information, description, or requirements in the exemplary calendar interface 20 shown in FIG. 2. The processor executes non-transitory computer implemented instructions to receive a calendar entry 18 from a user; receive lighting scene 40 selections from one or more invitees 48 and the user 44; and determine a workplace light setting 70 based at least in part by the user lighting scene 40 selection and the one or more invitee lighting scene 40 selections.

Figure 4:
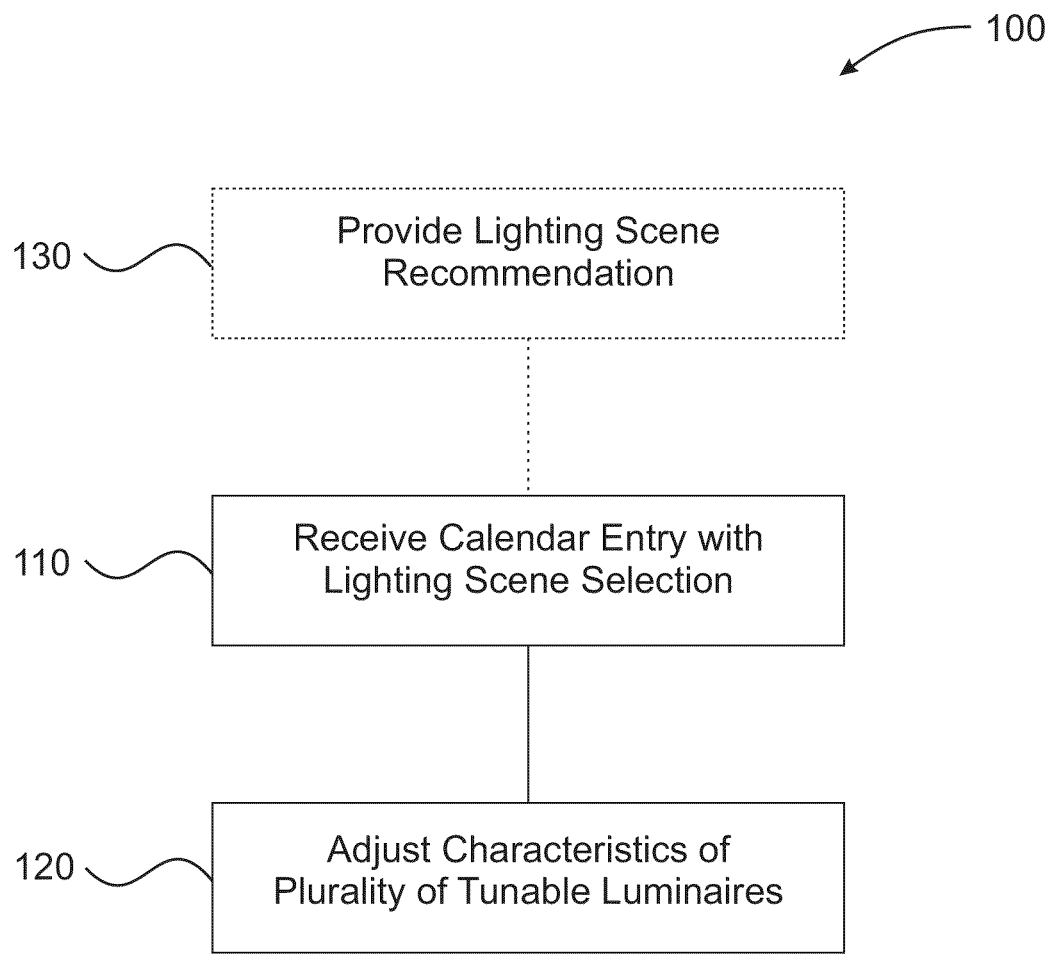
FIG. 4 is a flowchart showing operation of an exemplary system for controlling illumination of a workplace according to aspects of the present disclosure.

FIG. 4 is a flowchart showing an exemplary method 100 for controlling illumination of a workplace using the systems illustrated in FIG. 1-3. At step 110, a calendar entry 18 is received from a user 44 by a calendar module 16 executing on a computer-implemented device 20. The calendar entry 18 has a starting time 60, 64 for the future event and a lighting scene 40 selection for the event. The lighting scene 40 is selected using a user interface 12 of the calendar module 16 by a drop-down option, a voting option, or a checkbox option 84. The computer-implemented device 20 is a desktop computer, handheld computer, or smartphone (shown in FIG. 1). At step 120, at least one characteristics of a plurality of tunable luminaires in the workplace is adjusted by a lighting network 4 in communication with the computer implemented device.

At optional step 130, a lighting scene 40 recommendation is provided to the user 44 via the user interface 12 of the calendar module 16. The lighting scene 40 recommendation is provided based on historical data of lighting scene 40 selections. The lighting scene 40 recommendation can be changed by the user 44. The system may determine, through a passive process such as machine learning or an active process such as developer programming, a lighting scene 40 recommendation based on historical data associated with calendar entries 18, including the date 64 for an event; time 60 for an event; event recurrence 72; identity of user 44; identity of invitees 48; subject 52 of an event; location of an event; text, hyperlinks, or attachments associated with an event 68; inputted tags 76 which characterize and identify the event; equipment to be set up for the event; or any information, description, or requirements associated with an event.

Figure 5:
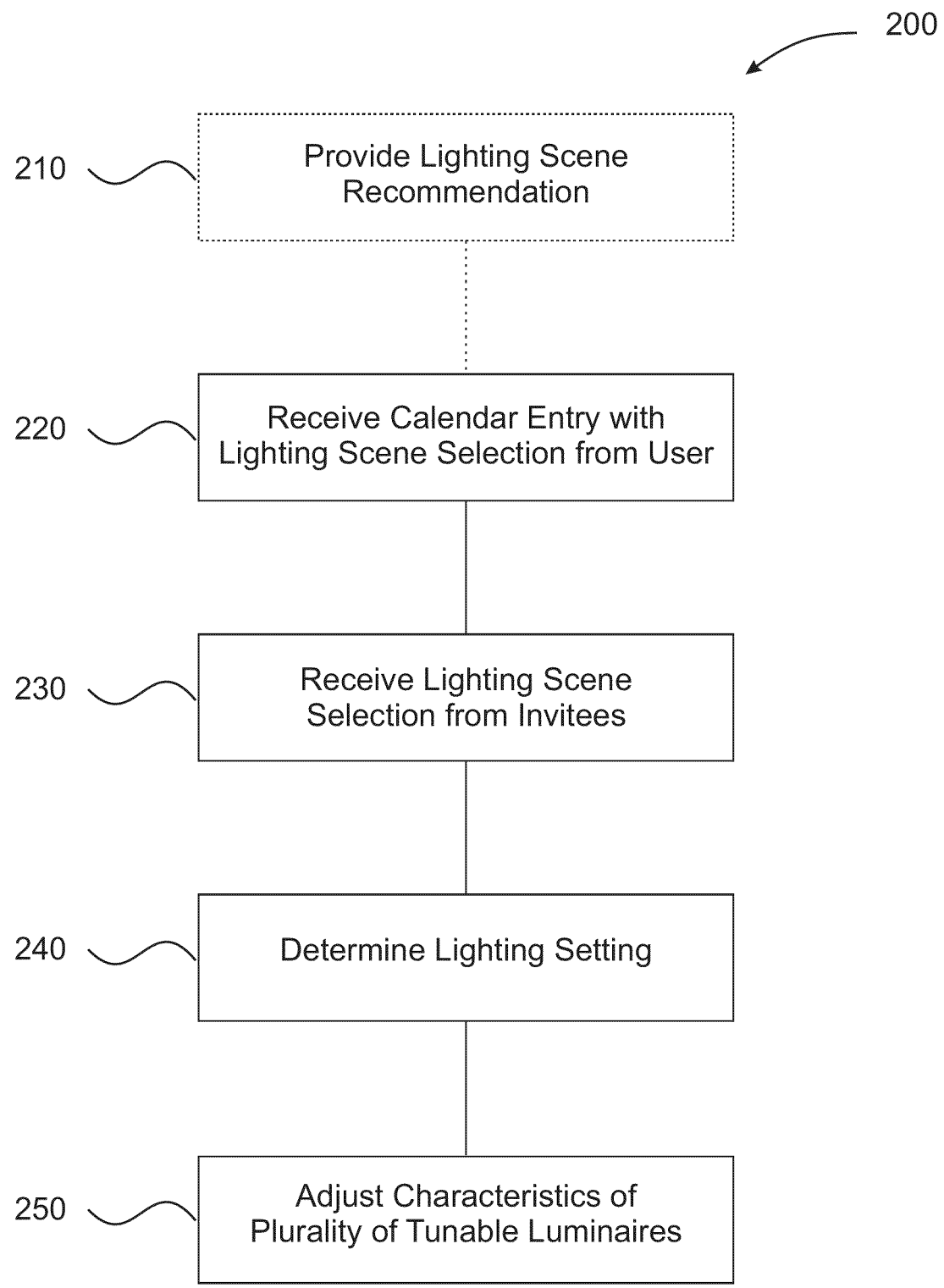
FIG. 5 is flowchart showing operation of an exemplary system for controlling illumination of a workplace according to aspects of the present disclosure.

FIG. 5 is a flowchart showing an exemplary method 200 for controlling illumination of a workplace. At optional step 210, a lighting scene 40 recommendation is provided to the user 44 via the user interface 12 of the calendar module 16. The lighting scene 40 recommendation is provided based on historical data associated with lighting scene 40 selections. The lighting scene 40 recommendation can be changed by the user. A user 44 may keep the lighting scene 40 recommended or make another lighting scene 40 selection. At step 220, a calendar entry 18 is received from a user 44 by a calendar module 16 executing on a computer-implemented device 20. The calendar entry 18 includes a starting time for the future event 60, 64, the identity of one or more invitees 48 to the future event, and a lighting scene 40 selection for the workplace. The lighting scene 40 is selected using a user interface 12 of the calendar module 16 by a drop-down option, a voting option, or a checkbox option 84 (shown in FIG. 2). The computer-implemented device 20 is a desktop computer, handheld computer, or smartphone. At step 230, one or more invitee lighting scene 40 selections are received from one or more invitees 48 by the calendar module 16 executing on a computer-implemented device 20.

Referring to FIG. 5, at step 240, a workplace lighting setting 70 is determined at least in part based on the user 44 lighting scene 40 selection and the one or more invitee 48 lighting scene 40 selections. As an example, a workplace lighting setting 70 may be selected by tallying the user 44 lighting scene 40 selection and the one or more invitee 48 lighting scene 40 selections. The selections by the user 44 and the invitees 48 may be given equal weight, or the lighting scene 40 selections may be weighed, for example, based on who made the selection or historical data. As another example, the user 44 may determine the weight to be given to the user 44 and invitee's 48 lighting scene 40 selections. Referring to FIG. 4, at step 250, at least one characteristic of a plurality of tunable luminaires 8 in the workplace is adjusted by a lighting network 4 in communication with the computer implemented device 20.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method of controlling illumination of a meeting room workplace, the method comprising:
  receiving, from a calendar module executing on a user device used for scheduling an event in a meeting room workplace, a calendar entry comprising:
    a starting time of a future event to occur in the meeting room workplace, and
    a lighting scene selection for playback in the meeting room workplace during the future event, the lighting scene being selected from one of a plurality of available lighting scenes, wherein the available lighting scenes correspond to preset lighting scenes available in the meeting room workplace;
  automatically adjusting, by a controller of a lighting network in communication with the user device, at least one characteristic of light emitted by a plurality of tunable luminaires in the meeting room workplace during the future event based on the lighting scene selection in the calendar entry.

2. The method of claim 1, wherein the at least one characteristic of the tunable luminaires that is adjusted is selected from: color temperature, light intensity, brightness, lighting power density, lighting power, illuminance, equivalence melanopic lux, light angle, and correlated color temperature.

3. The method of claim 1, wherein the lighting scene is selected using a user interface, rendered by the calendar module, by a drop down option, a voting option, or a checkbox option.

4. The method of claim 3, further comprising the step of providing a lighting scene recommendation to the user via the user interface of the calendar module.

5. The method of claim 4, wherein the lighting scene recommendation is provided based on historical data of lighting scene selections.

6. The method of claim 1, wherein the user device is a desktop computer, handheld computer, or smartphone.

7. A method of controlling illumination of a workplace, the method comprising:
  receiving, by a calendar module executing on a user device used for scheduling an event in the workplace, a calendar entry comprising:
    a starting time of a future event to occur in the workplace;
    one or more invitees to the future event; and
    receiving, by the calendar module one or more lighting scene selections for playback in the workplace during the future event;
  determining a workplace lighting setting based at least in part on the one or more lighting scene selections received from the one or more invitees;
  transmitting, to a controller of a lighting network in communication with the user device, the one or more lighting scene selections for the controller to adjust at least one characteristic of light emitted by a plurality of tunable luminaires in the workplace during the future event based on the determined workplace lighting setting.

8. The method of claim 7, wherein the lighting scene is selected using a user interface in the calendar module by a drop down option, a voting option, or a checkbox option.

9. The method of claim 7, further comprising the steps of providing a lighting scene recommendation to the user via the user interface of the calendar module.

10. The method of claim 9, wherein the lighting scene recommendation is provided based on historical data of lighting scene selections.

11. The method of claim 9, wherein the user device is a desktop computer, handheld computer, or smartphone.

12. A lighting system for controlling illumination of a room, comprising:
  one or more tunable luminaires arranged to illuminate the room;
  a calendar module executing on a user device, the calendar module used for scheduling a meeting in the room and configured to receive information for a calendar entry, wherein the information for the calendar entry comprises a starting time of a future event to occur in the room, one or more invitees to the future event, and a plurality of lighting scenes for playback in the room during the future event; and
  a lighting controller in communication with the calendar module and the one or more tunable luminaires, wherein the lighting controller is configured to:
    receive a lighting scene selection from the one or more invitees, and
    generate one or more control signals to automatically adjust at least one characteristic of the light emitted by the one or more tunable luminaires in the room during the future event based on the lighting scene selection from the one or more invitees in the calendar entry.

13. The lighting system of claim 12, wherein the at least one characteristic of the tunable luminaires that is adjusted is selected from: color temperature, light intensity, brightness, lighting power density, lighting power, illuminance, equivalence melanopic lux, light angle, and correlated color temperature.

14. The lighting system of claim 12, wherein the calendar entry further comprises a lighting scene recommendation to the user.

* * * * *